US012241140B2

(12) United States Patent
Ormeno et al.

(10) Patent No.: US 12,241,140 B2
(45) Date of Patent: Mar. 4, 2025

(54) WATER BALANCE IN A CHLORIDE HEAP LEACH

(71) Applicant: BHP CHILE INC, Santiago (CL)

(72) Inventors: Damaso Barrios Ormeno, Antofagasta (CL); Clement Chilowa Chibwana, Antofagasta (CL); Johannes Mattheus Strauss, Antofagasta (CL)

(73) Assignee: BHP CHILE INC, Santiago (CL)

(*) Notice: Subject to any disclaimer, the term of this patent is extended or adjusted under 35 U.S.C. 154(b) by 291 days.

(21) Appl. No.: 16/955,948

(22) PCT Filed: Dec. 20, 2018

(86) PCT No.: PCT/IB2018/060422
§ 371 (c)(1),
(2) Date: Jun. 19, 2020

(87) PCT Pub. No.: WO2019/123365
PCT Pub. Date: Jun. 27, 2019

(65) Prior Publication Data
US 2020/0325556 A1    Oct. 15, 2020

(30) Foreign Application Priority Data

Dec. 21, 2017  (ZA) ................................ 2017/08732
Jan. 18, 2018  (ZA) ................................ 2018/00346

(51) Int. Cl.
*C22B 3/10*     (2006.01)
*C22B 15/00*    (2006.01)

(52) U.S. Cl.
CPC ............ *C22B 3/10* (2013.01); *C22B 15/0069* (2013.01)

(58) Field of Classification Search
CPC .... C22B 3/04; C22B 3/06; C22B 3/08; C22B 15/0063; C22B 15/0069; C22B 15/0071; C22B 3/10; Y02P 10/20
See application file for complete search history.

(56) References Cited

U.S. PATENT DOCUMENTS 5,232,490 A * 8/1993 Bender .................... C22B 3/10
                                                          423/40
6,926,753 B2   8/2005 Faine et al.

FOREIGN PATENT DOCUMENTS

WO    WO 2014/030048 A1    2/2014
WO    WO 2014195586 A1    12/2014
(Continued)

OTHER PUBLICATIONS

Written Opinion of the International Searching Authority for PCT/IB2018/060422 dated Mar. 21, 2019, 5p.
(Continued)

*Primary Examiner* — Keith D. Hendricks
*Assistant Examiner* — Moriah S. Smoot
(74) *Attorney, Agent, or Firm* — Crowell & Moring LLP

(57) ABSTRACT

The effect of seawater on the solid-liquid equilibrium in acid medium of $CuSO_4$ (pH=2) was studied at different temperatures (25 to 50° C.). Physicochemical properties (densities, refraction index, viscosities and conductivities) were measured in saturation and unsaturation conditions.
This system was compared with $CuSO_4$+water system. Solubilities and properties were measured of both systems (seawater and pure water) and the final results were similar with an average difference between $CuSO_4$ in seawater and $CuSO_4$ in pure water of 1.42% for solubility, 1% for density, 0.29% for refractive index and 5.61% for viscosity. However conductivities values showed most interesting results due
(Continued)

that seawater present major salinity than pure water, with an average differences of 24.61%.

The effect of seawater in the leaching of ore (chalcopyrite, 2.55% CuT) using different acids ($H_2SO_4$, HCl, $HNO_3$), different oxidants ($Fe^{3+}$, $Cu^{2+}$, $NO_3^-$) and chloride medium (NaCl) was also studied. Parallel tests of stirring leaching were performed using seawater and pure water as solvents, at 45° C. and size particle under 210 μm.

The system $H_2SO_4$ (1 M)+$NaNO_3$ (1 M)+seawater showed the better results of copper extraction of 78.8% in 3 days of leaching. The systems with nitrate as oxidant in acid medium presented better results than the other system (without nitrate) due to high oxidation potential value of nitrate in comparison with other oxidants used in this work. Moreover when the system had high H+concentration in the presence of nitrate, the oxidation potential was higher with respect to the system without nitrate, the best results in the copper extraction was obtained in the system HCl (pH=0.5)+seawater with a 37.4% in 7 days of leaching.

In general, comparing both system (seawater and pure water), the seawater as a solvent had better extraction of copper except when NaCl was added to the seawater where it was observed a slow kinetics and low copper extraction, due to the saturation of ions in the solution, obstructing an easy diffusion of leaching reagent to ore.

8 Claims, 11 Drawing Sheets

(56) References Cited

FOREIGN PATENT DOCUMENTS

| WO | WO 2015/059551 A1 | 4/2015 |
| WO | WO 2019/123362 A1 | 6/2019 |

OTHER PUBLICATIONS

International Search Report for PCT/IB2018/060422, dated Mar. 21, 2019, 3p.
International Preliminary Report on Patentability for PCT/IB2018/060422 dated Mar. 31, 2020, 12p.
Bowell, R. J. et al., "Geochemical evaluation of heap rinsing of the Gold Acres Heap, Cortez joint venture, Nevada", *Minerals Engineering*, V. 22, No. 5, Apr. 1, 2009, pp. 477-489, Pergamon Press, Oxford, GB.
U.S. Appl. No. 16/955,936, filed Jun. 19, 2020.
Abstract only from Hernández et al. (1 pp.).

* cited by examiner

WATER BALANCE IN A CHLORIDE HEAP LEACH

This application is a National Stage application of International Application No. PCT/IB2018/060422, filed Dec. 20, 2018, the entire contents of which are incorporated herein by reference.

This application claims priority under 35 U.S.C. § 119 (a) to 1) South African Patent Application No. 2017/08732, filed on Dec. 21, 2017, and 2) South African Patent Application No. 2018/00346, filed on Jan. 18, 2018, the entire contents of each of which are incorporated herein by reference.

BACKGROUND OF THE INVENTION

Field of the Invention

This invention relates to a high chloride leaching method of copper ores.

Description of the Related Art

Bioleaching of low grade copper sulfide ores using acid sulfate solutions with bacteria is an established commercial process applied worldwide.

More recently, methods of chloride leaching have been developed to allow leaching of copper sulfide ores, including chalcopyrite, at high potentials without the use of bacteria. Disclosures in WO2015/059551 and WO2014/030048 teach the use of high chloride concentrations to overcome passivation of the chalcopyrite, allowing operation at solution oxidation potentials above 700 mV vs SHE, resulting in increased leach rates and higher copper recoveries.

A high chloride concentration enhances the rate at which oxidants, such as cupric ions (Cu(II)) and ferric ions (Fe(III)), are formed in the presence of an oxygen-bearing gas. These oxidants then react with the copper sulfide minerals to release copper into solution.

In practice, heap leaching of copper ores in chloride solutions on a commercial scale is confined by constraints which, if ignored, will limit the economic viability of the process. A particular constraint to heap leaching at high chloride concentrations (100-230 g/L chloride) is the loss of chloride, from the circuit, in solution contained in the leached residue as moisture.

U.S. Pat. No. 5,232,490 discloses a method of extracting precious metal from sulfidic materials by means of chloride heap leaching. The ore is leached in a heap for 30 to 60 days. Following the leaching cycle, the heap is washed with water in order to recover entrained chloride and metal values.

An aim of the current invention is to address, at least partly, the aforementioned issue i.e. to maximise the amount of water which is available and which is suitable for rinsing the leached residue solids, thereby to allow chloride recovery, and a reduction in chloride losses from the process.

SUMMARY OF INVENTION

The invention provides a method of maximising the amount of water which is available for rinsing (or washing) leached residue ore in a high-chloride heap leach operation, the method including the step of using process make-up water to rinse leached ore, in the heap, thereby to displace a chloride-containing aqueous liquor from the leached ore.

The quantity of process make-up water, in the rinsing step preferably may be between 0.1 and 0.15 m³/ton of ore.

Heap leaching at chloride concentrations of between 100 is 230 g/L is considered high chloride leaching.

"Water balance" relates to the difference in a volume of water flow into a system and a volume of water flow out of the system.

To maximise the amount of process make-up water available for rinsing and to prevent an inadvertent purge and a corresponding loss of chloride and copper, methods for increasing the quantity of process make-up water, and for utilizing the process make-up water, may be implemented as follows:

a) a water deficit may be created by increasing evaporation from the leach operation, for example by making use of aerial sprayers, or by not placing evaporation-reducing devices such as covers on ponds or solar films on heaps i.e. leaving such devices exposed to atmosphere;

b) rain water may be diverted from the heap;

c) scrub water volume in a copper solvent extraction circuit may be reduced by utilising a multi-stage, counter-current, loaded organic solvent scrub approach; and d) a demand for electrowinning bleed make-up water may be reduced by effective scrubbing of the loaded organic, so that it is related to the above.

The chloride concentration in the organic phase may be reduced to below 50 ppm.

The process make-up water, which contains little or no chloride, is used to displace the chloride-containing aqueous liquor, which is then recovered and recycled to the heap leach operation, thereby decreasing make-up salt added to the operation.

The rinsing step may be carried out for a period of from 5 to 100 days. Preferably the period is 20 days.

Residual soluble copper which remained in the leached ore residue or the chloride-containing aqueous liquor may be recovered in the rinse water during the rinsing step, and may be returned to the leach operation and, subsequently, may be recovered through the use of a solvent extraction step and an electrowinning step, thereby increasing overall copper recovery.

The quantity of process make-up water, in the rinsing step, may be in the range of 0.05 to 0.35 m³/ton of ore and preferably is between 0.1 and 0.15 m³/ton of ore.

The chloride and the copper recovered in the aqueous liquor displaced in the rinse step, by the process make-up water, may each be expressed as a fraction of the total content in the residue ore before rinsing and can be defined as a "wash efficiency". The wash efficiency is typically between 40% and 85% for the wash volume indicated (i.e. in the range of 0.05 to 0.35 m³/ton of ore). A desired fraction (or ratio) is of the order of 60%.

The chloride level may lie in the range referred to and typically is 150 g/L; but this is exemplary only, and non-limiting.

BRIEF DESCRIPTION OF THE DRAWINGS

The invention is further described by way of examples with reference to the accompanying drawings wherein.

DESCRIPTION OF PREFERRED EMBODIMENTS

Figure 1:
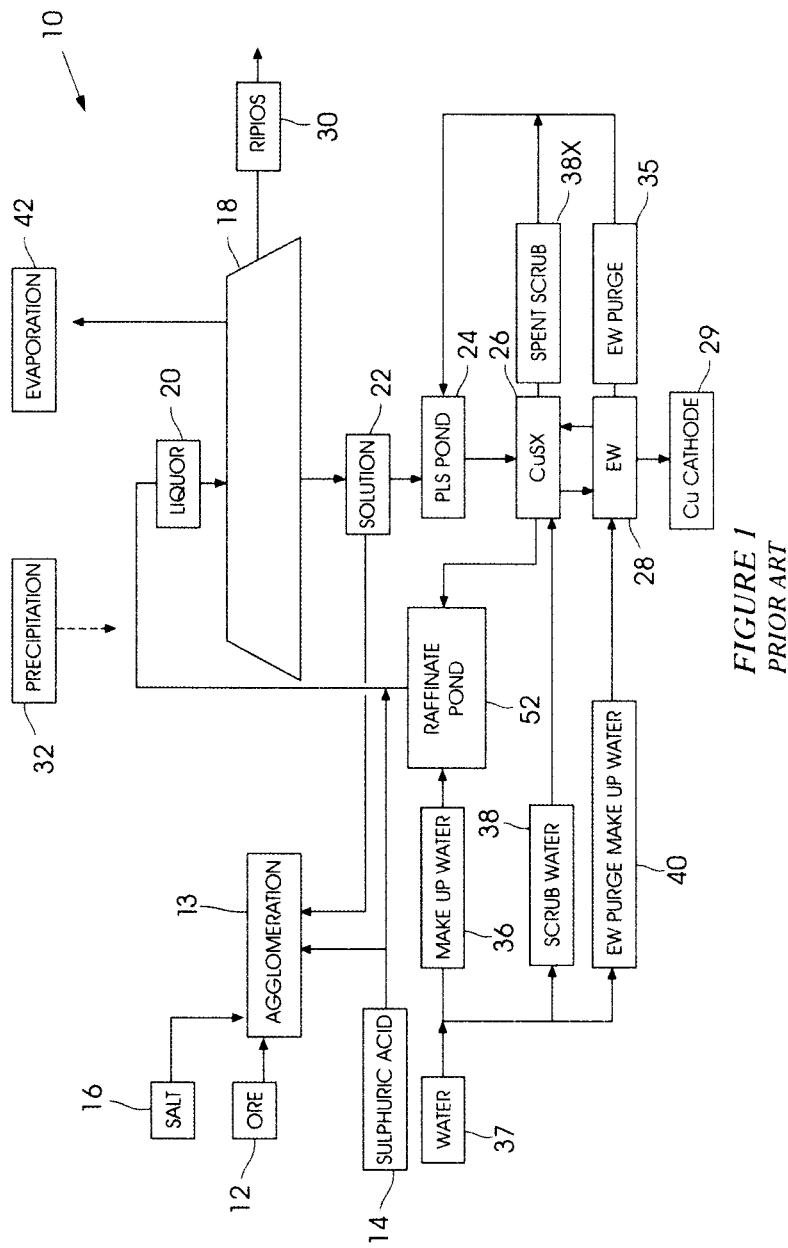
FIG. 1 is a diagrammatical representation of a conventional heap leach process.

FIG. 1 of the accompanying drawings shows a generic heap leach process 10 which includes a single stage heap leach. In general, the process of chloride heap leaching is applied using a method of heap construction and operation known as "race tracks". In a race track-type heap, ore 12 is agglomerated (13) using acid 14 and salt 16 and is stacked in a heap 18 onto a pad (not shown). The heap 18 is irrigated with an aqueous leach liquor 20 for a set time period. This liquor 20 is recycled over the heap 18. Copper liberated from the ore 12 is mobilised into a pregnant leach solution 22 which drains from the heap 18 into a pregnant leach solution pond 24.

Through a combination of an organic solvent extraction step 26 and an electrowinning step 28, copper metal 29 is recovered from solution.

At the end of the leach period, the irrigation is stopped and the leached ore is allowed to drain down. The leached ore residue 30 (also referred to as ripios) and any entrained aqueous liquor is removed and sent to a dump facility.

Figure 2:
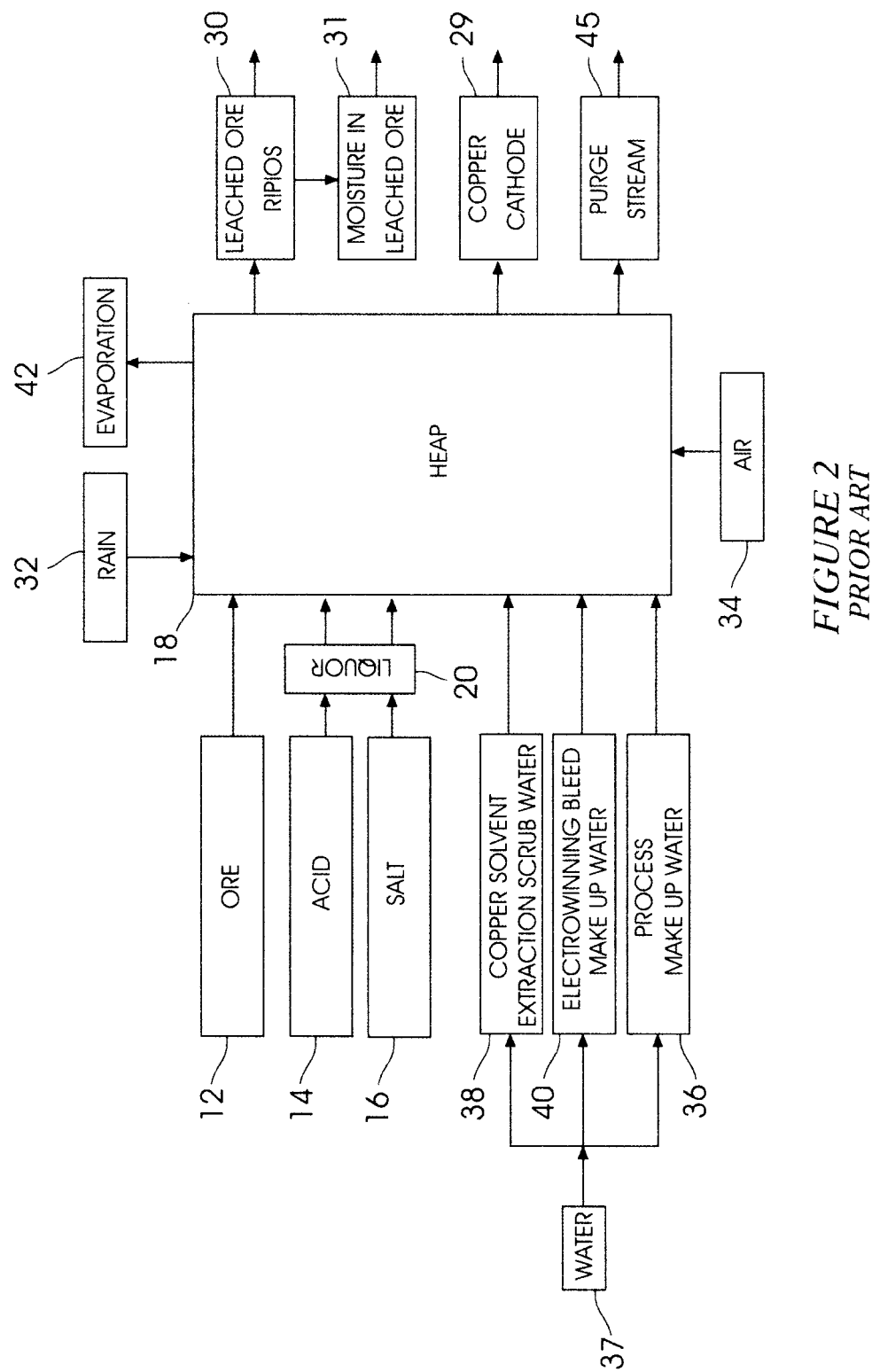
FIG. 2 is a "black box" diagram of the inputs and outputs of the heap leach process in FIG. 1.

FIG. 2 show various inputs to, and outputs from, the heap 18. The inputs include:

a) ore 12: the mined mineral deposit that carries a value mineral or metal, in this case copper;

b) acid 14: generally this is sulfuric acid which is added to the ore 12 to maintain an acidic environment and to provide acid for reacting with gangue minerals, and for copper mineral dissolution and generation of Fe(III), and Cu(II) oxidants, and for the release of soluble copper and other metal ions into the pregnant leach solution 22;

c) rain or precipitation 32: i.e. rain which falls onto the heap 18 and associated ponds and which subsequently joins the solution that is circulated in the process;

d) air 34: the air is driven into the process to provide oxygen as an oxidant for the generation of Cu(II) and Fe(III) and for sulfide mineral leaching;

e) process make-up water 36: this water is used to make-up any deficit where the amount of water in the output is greater than the amount of water in the input; the process make-up water is added to compensate for water lost by evaporation (42), for water lost as moisture in the leached ore residue (30) and for water lost in a purge stream 45 taken from the leach circuit, as and when required.

f) copper solvent scrub water 38: this water is used during solvent extraction to remove chloride entrained in an organic phase thereby to prevent transfer of the chloride to an electrolyte which reports to a subsequent electrowinning process;

g) electrowinning bleed make-up water 40: this water is used to replace the electrolyte bleed removed from the circuit to control a level of impurities therein; and h) salt 16: to introduce chloride.

i) water 37: this comprises the make-up water 36, the scrub water 38 and the electrowinning make-up water 40.

The outputs shown in FIG. 2 are as follows:

a) the leached ore (ripios) 30 which includes the moisture as entrained solution 31 in the leached ore residue 30 (i.e. ripios). This is the residual aqueous solution that remains with the leached ore 30 once irrigation with the leach liquor 20 has been stopped, the leached ore 30 has been drained and the pregnant leach solution 22 has been collected;

b) evaporation 42 from the heap and associated ponds i.e. water which is lost to atmosphere;

c) copper 29 i.e. the target metal which is recovered from the ore 12; and d) the purge stream 45 which is used as required to remove impurities from the circuit, or to lower the acid concentration in the leach liquor 20. A purge stream 45 can be taken from any suitable solution stream or pond in the heap leach process 10, in order to remove impurities. It is preferable that the stream should contain a low copper concentration to prevent significant copper loss from the heap leach process 10.

The air 34 which is introduced into the heap 18 exits from the sides and top of the heap as air streams (not shown) which are depleted in oxygen.

Figure 3:
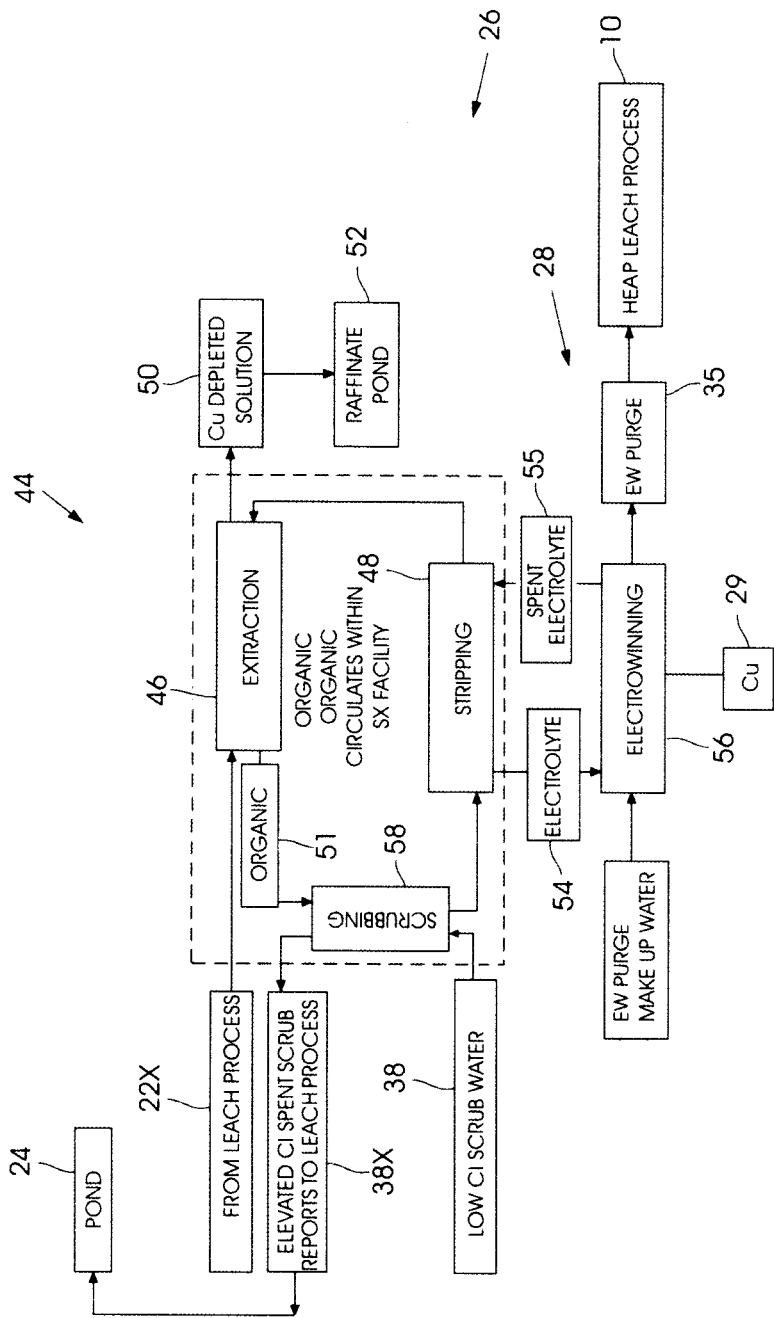
FIG. 3 is a diagrammatical representation of a solvent extraction process and an electrowinning process which form part of the process in FIG. 1.

FIG. 3 is a simplified flow diagram of the copper solvent extraction step 26 and the electrowinning process step 28. The pregnant leach solution 22X is passed from the pond 24 through an organic solvent extraction facility 44 which includes an extraction process 46 followed by a scrubbing process 58 and then a stripping process 48.

During the extraction process 46 the dissolved copper ions are taken from the pregnant leach solution 22X into an organic phase 51 and a copper-depleted solution 50 is then directed to a raffinate pond 52 for recycling to the heap 18 during irrigation. During the scrubbing process 58, the organic phase 51 is scrubbed using the low chloride scrub water 38 to remove chloride contained in small amounts of entrained aqueous solution within the organic phase. The scrub water 38X, after use, is re-circulated to the PLS pond 24.

During the stripping process 48, dissolved copper is taken from the organic phase 51 into an electrolyte 54 which is directed to an electrowinning step 56 in the process 28, in which dissolved copper ions are reduced and then removed as the copper metal 29. Spent electrolyte 55 is returned to the stripping process 48. An electrowinning purge 35 may be recycled from the electrowinning step 56 to the heap leach process 10, preferably to the PLS pond 24.

The only water exiting the process 10, shown in FIG. 2 is the moisture 31 in the leached ore 30, in the evaporation 42 and in the purge stream 45 where solution is removed from the circuit to limit the build-up of impurities in the circuit solutions, or to lower the acid concentration. The moisture level in the leached ore 30 can range from 5% to 25% volume per mass, or more typically from 8% to 20%, depending on the characteristics of the ore material.

The chloride in the leach liquor 20 within the process 10 may come from the ore 12 itself, but mostly needs to be added in the form of the salt 16. This is because most of the ores typically contain very little soluble chloride. By way of comparison the amount of chloride required in the leaching process 10 ranges from 100-230 g/L in the leach liquor 20.

The amount of chloride added to the heap leach operation must equate to the amount lost. The only mechanism whereby chloride-containing salt is removed from the process is via precipitated salts and chloride-containing moisture in the leached heap residue i.e. in the ripios 30. If purge is taken out of the circuit (not recycled internally) then this would contribute to chloride, acid and copper loss and to the removal of dissolved metals and salt impurities from the circuit. Normally a purge of high copper solution would not be taken out of the circuit. A purge is thus used only as a last resort.

The lost chloride must be replaced. The chloride could be added as sodium chloride or through the use of a similar salt. This salt needs to be purchased and transported to the processing site. Overall, under average conditions, there is usually a net decrease in solids mass from the ore of about 5%, due to the loss of gangue and ore minerals by the process of leaching which offsets a small gain from precipitated salts. Briefly, it is pointed out that the precipitation of Fe adds mass since precipitated iron salts contain sulfate, hydoxy ions and Na or K so the mass of precipitate is greater than mass of iron metal and sulphide leached (due to addition of S and oxygen from solution. The mass addition from precipitates compensates for mass loss due to copper and gangue mineral dissolution, but typically overall a net mass loss of about 5% may be expected.

The cost of salt and transport thereof is dependent on the location of the processing site. Costs may be as low as US$2.5/T, or as high as US$40/T (exemplary figures only). A high chloride heap leach operation typically starts production at a rate of 10 000 000 tons of ore per annum and can increase substantially beyond that. Thus the purchase and transport costs of the salt can be substantial.

Figure 4:
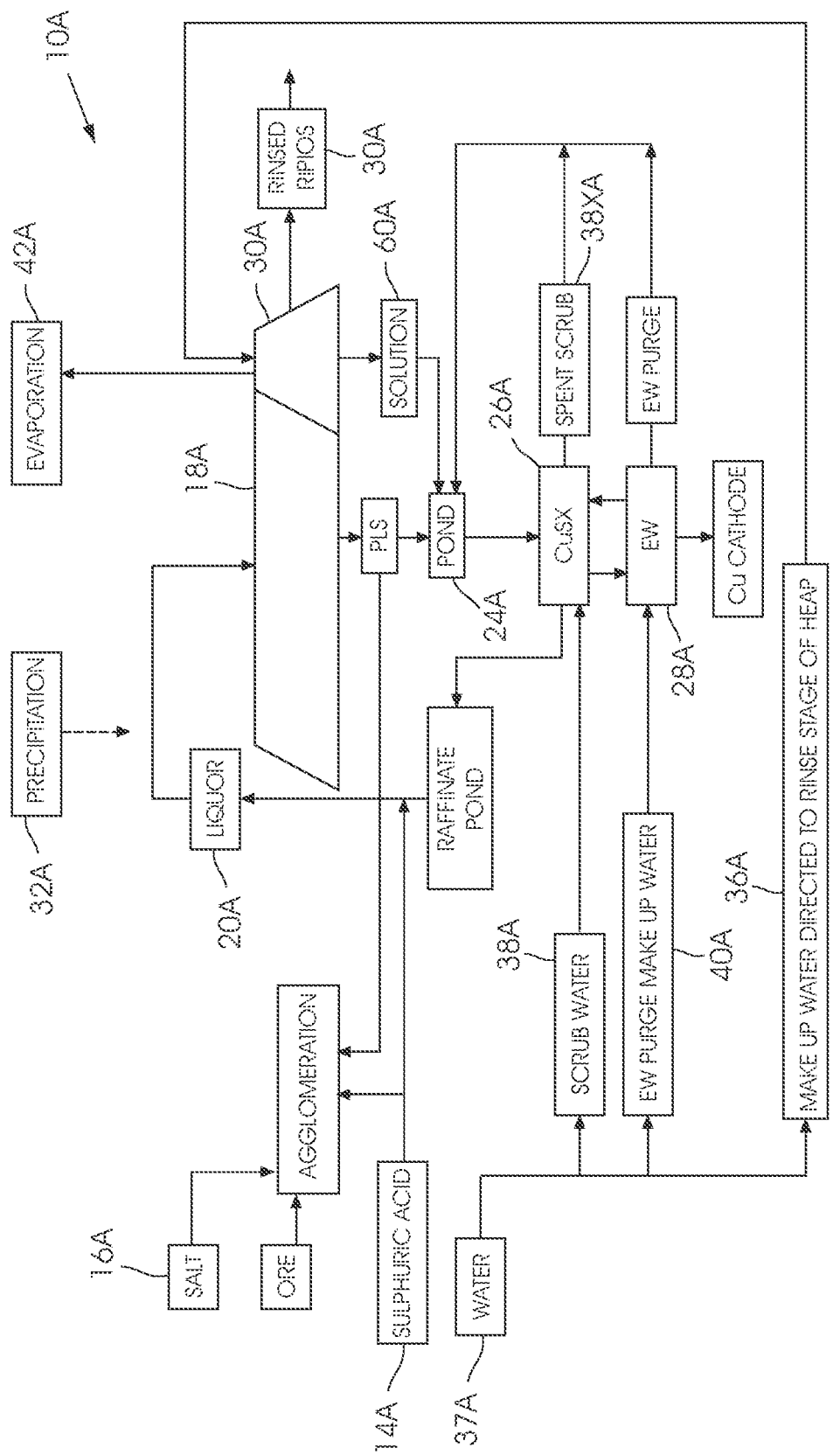
FIG. 4 shows an optimised heap leach process according to the invention.

FIG. 4 shows a process 10A according to the invention which in many respects is similar to that shown in FIG. 1. The water 37A comprises the make-up water 36A, the scrub water 38A and the electrowinning make-up water 40A.

The salt 16A comprises salt added at the start of the process and the additional salt (make-up salt), needed to maintain the required chloride concentration in the process solution, for example in the liquor 20A.

The make-up water 36A is directed to the leached residue ore 30A to rinse the ore and to displace entrained solution with a high chloride concentration into a rinse stream solution 60A. The make-up water 36A is low in chloride whereas the rinse stream solution 60A is high in chloride. The rinse stream solution 60A is directed to the pregnant leach pond 24A, or to any other suitable pond in the heap leach circuit. Thus a significant portion of the original salt content is retained in the process.

Following irrigation with aqueous leach liquor 20A, a rest period of 5 to 50 days, typically 20 days, prior to the start of rinsing the heap 18A with make-up water 36A is preferred, to allow the bulk of entrained irrigation solution to drain from the heap 18A so a residual moisture level of 8% to 20%, typically 10%, is achieved. Rinsing a drained heap improves the wash efficiency.

The rinsing period for application of the make-up water 36A to the leached ore residue 30A varies from 5 to 100 days, preferably 10 to 50 days, or typically 20 days.

The process 10A relates to salt saving, but there is an additional benefit in that a portion of any residual soluble copper that remains in the leached ore 30A is placed back into the process 10A where it can subsequently be recovered through the use of a solvent extraction step 26A and an electrowinning step 28A.

Figure 5A:
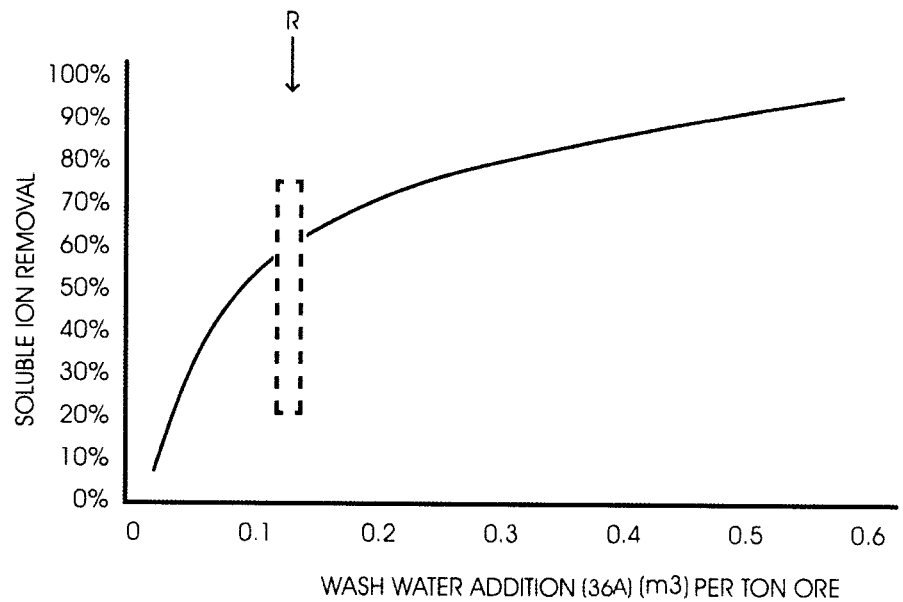
FIG. 5A is a wash efficiency curve which shows graphically the recovery of soluble ions on a percentage basis during a rinsing stage as a function of the quantity of wash water addition per ton of ore.

FIG. 5A shows a wash efficiency curve calculated using the displacement of soluble copper from the leached ore. The percentage copper displaced would apply to any soluble species, including chloride—copper was used as an indicator due to the accuracy of the solution assay. The curve indicates a likely range R of operation where expected process make-up water (36A) demand expressed on a per ton of ore basis is balanced with soluble ion recovery (expressed as a percentage). This range can be varied depending on the circumstances. The range R is between 0.05 and 0.35 $m^3$/ton of ore and preferably is between 0.1 and 0.15 $m^3$/ton of ore. The curve in FIG. 5A indicates that an optimum wash efficiency at the range R is between 50% and 70%. A target recovery at a wash water addition of 0.1 $m^3$/ton is 60%.

Figure 5B:
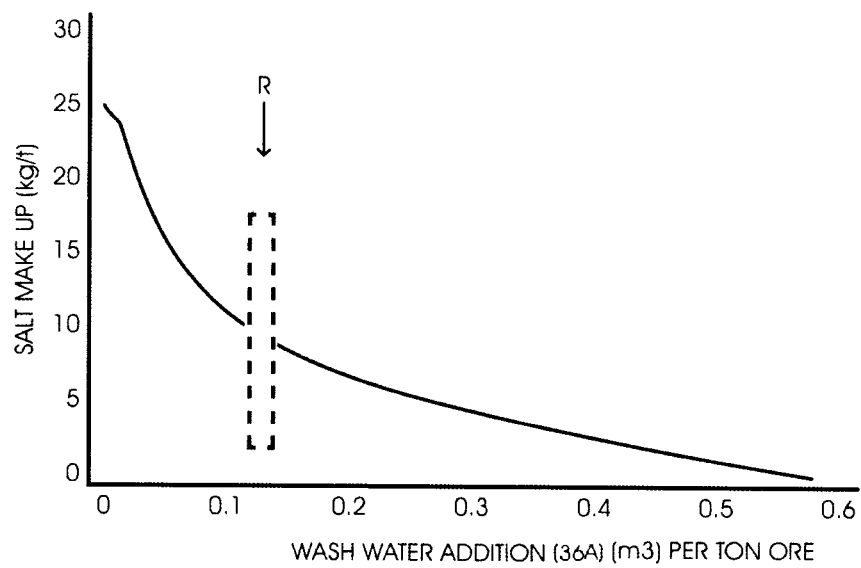
FIG. 5B shows graphically the reduction in salt make-up addition in kg/L required as a function of the quantity of wash water addition per ton of ore.

FIG. 5B indicates the reduction of make-up salt addition in kg/T as a function of the wash water addition 36A. The reduction in make-up salt, which is directly related to the recovery of salt, is achieved by rinsing the residue ore with the indicated amount of make-up water 36A, as wash water.

An effective way to maximise the quantity of the make-up water 36A, available for rinsing, is to reduce the amount of water entering the process through other streams. Water enters the process through rainfall 32A, acid 14A, acid reaction, solvent extraction scrub water 38A and electrowinning bleed make-up water 40A. A water deficit is generated by evaporation 42A.

Figure 6:
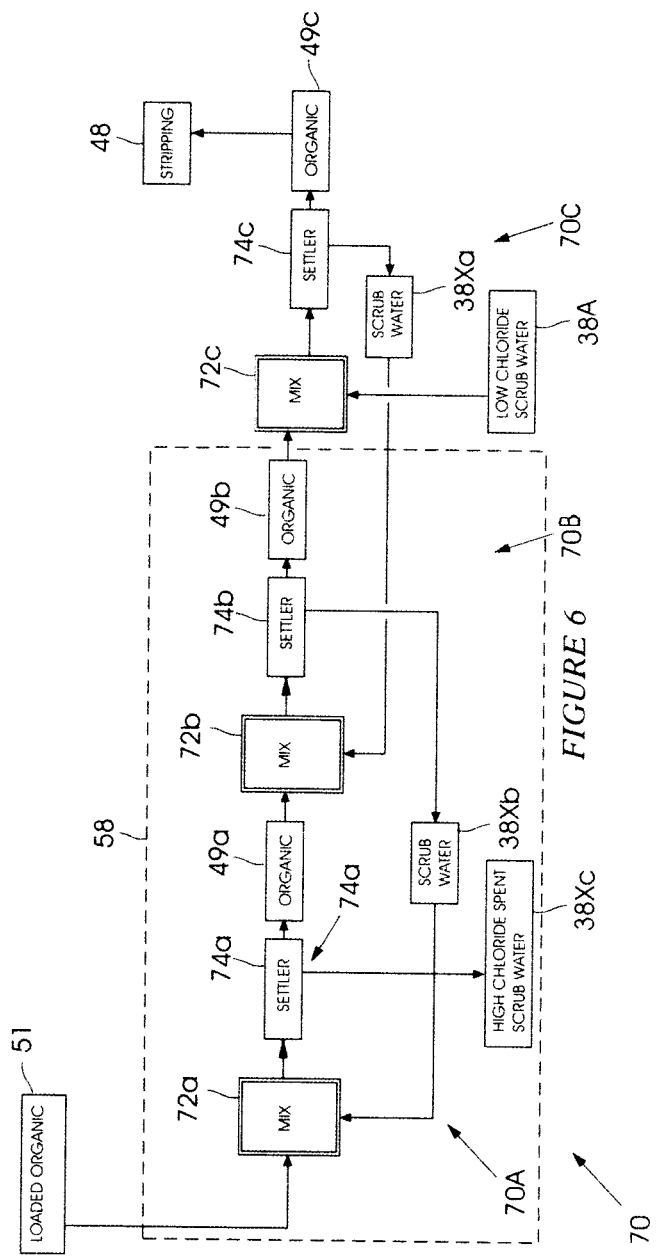
FIG. 6 is a diagrammatic representation of an optimised copper solvent extraction loaded organic scrub process making use of a counter-current circuit, which forms a part of the process in FIG. 4.

The following can be considered to maximise the amount of water that can be directed to the rinse stage. The scrub water 38A can be reduced by utilising a multistage countercurrent approach 70, as is shown in FIG. 6, which allows a greater amount of make-up water 36A to be employed for rinsing the leached ore 30A (or ripios).

The process 70 comprises a first stage 70A, a second stage 70B and a third stage 70C. More stages could be added, but there would be diminishing gains and increasing capital costs. An optimum performance for the process 70 is expected with 3 stages. The loaded organic phase 51 is directed from the extraction process 46 to a mixer 72a for mixing with a first intermediate high chloride spent scrub water 38Xb obtained from a settler 74b in the second stage 70B of a previous cycle, and subsequently directed into a settler 74*a* for separating into a scrubbed organic 49*a* and a high chloride spent scrub water 38Xc.

The organic phase 49*a* reports to a mixer 72*b* (in the current second stage 70B) for mixing with a second intermediate high chloride spent scrub water 38Xa (obtained from the spent scrub water in the third stage 70C of a previous cycle) and then to a settler 74*b* for separating into an intermediate high chloride organic 49*b* and the intermediate spent scrub water 38Xb (to be directed to the first stage 70A of a subsequent cycle).

The organic phase 49*b* reports to a mixer 72*c* (of the current third stage 70C) for mixing with fresh scrub water 38A and then to a settler 74*c* for separating into a scrubbed organic 49*c* and an intermediate high chloride spent scrub water 38Xa (to be directed to the second stage 70B of a subsequent cycle). The scrubbed organic 49*c* reports to the stripping process 48.

Solvent extraction plants use mixers/settlers for aqueous and organic contact and separation, respectively. The two fluids are combined in a mixer, to form a dispersion with the aqueous fluid forming a continuous phase, while the organic fluid is dispersed within it as a discontinuous phase. The aqueous/organic dispersion reports to a settler where the two fluids separate into an organic phase and the aqueous phase. The separation is not perfect and each phase carries some of the other fluid entrained within it.

The resulting organic 51 that comes from the extraction, or loading stage in a solvent extraction process 46, reports to the scrub stage 58.

Figures 7A, 7B, 7C:
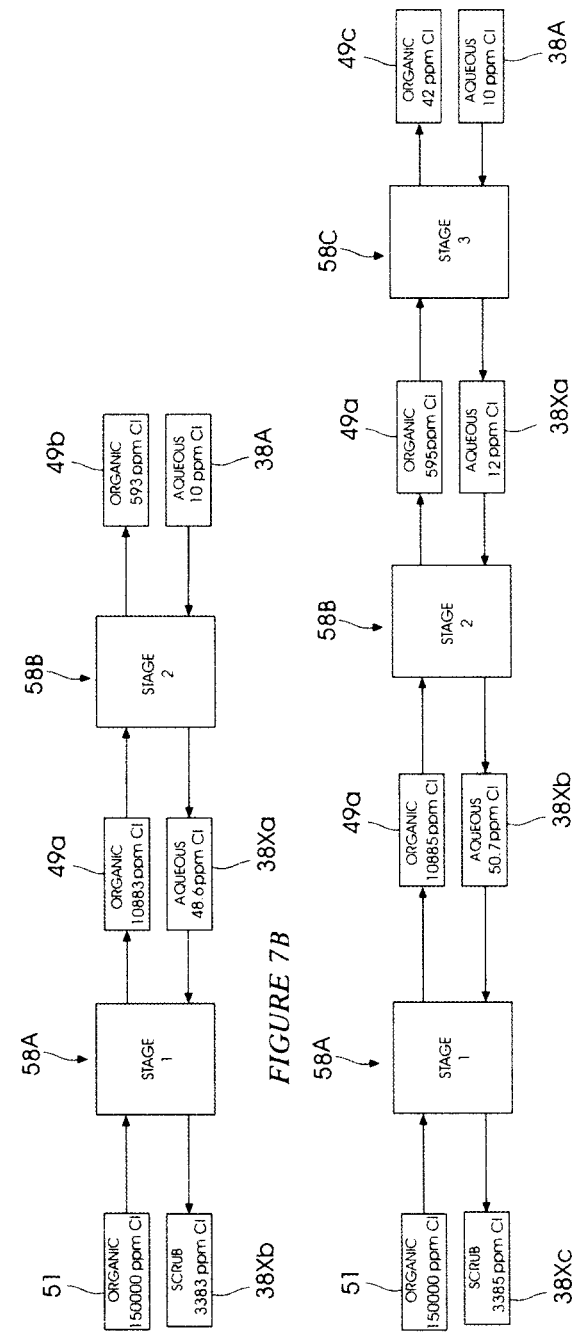
FIGS. 7A, 7B and 7C respectively show different counter-current scrub circuits which can be used in the scrub process of FIG. 6, operated in order to reduce a chloride concentration in an electrolyte which reports to a downstream electrowinning process.

FIGS. 7A, 7B and 7C respectively show a single stage counter-current scrub circuit, a two stage counter-current scrub circuit, and a three stage counter-current scrub circuit, used to reduce chloride concentration of the organic phase 51.

The organic phase 51 that enters the scrub stage 58 has an entrained pregnant leach solution with a chloride content typically of about 150 000 ppm. It is usually desirable to reduce this level to about 50 ppm before copper is stripped into the electrolyte 54.

In the single cycle scrub stage 58A, FIG. 7A, the organic phase 51 from the extraction stage 46 is combined with a low chloride aqueous solution 38A in a mixer. The scrubbing is not perfect and some of the entrained chloride passes through in the entrained solution of the final organic phase 49*a*.

FIG. 7B shows a two-cycle counter-current scrub stage 58A, 58B. The resulting organic phase 49*b* has a lower entrained chloride content than the organic phase 49*a* resulting from the single-cycle scrub stage 58A. However, in a high chloride leach operation, a two-cycle scrub stage may not be sufficient to reduce the chloride content of the resulting organic phase, unless copious scrub water is employed.

In the process 10A, a three-stage counter-current scrub circuit 58A, 58B, 58C is employed (FIG. 7C. In this circuit, the chloride concentration in the organic phase 49*c* from the final stage 58C is reduced to below 50 ppm, with scrub flows of about only 1/75 of the organic resulting from the extraction stage 46.

Scrub water in a multi-cycle counter-current scrub stage is reduced to less than one third of that used in a typical conventional single stage scrub circuit. The water that is saved here can be employed as wash water 36A, in FIG. 4, that can then be used for rinsing the leached ore. This maximises wash efficiency in terms of chloride recovery and decreases loss of the soluble copper to the leached ore.

The following description relates to test work done to validate the inventive principles which have been described.

Experimental Evaluation—Integrated Pilot Plant

EXAMPLE

An integrated pilot plant incorporating 9 cribs and a solvent extraction plant was established to replicate the application of the method of the invention on a pilot scale. The plant was designed to treat various low grade chalcopyrite ores using a dynamic "race track" style heap leach operation. This is a heap comprised of multiple sectors wherein new sectors are stacked and older, most-leached sectors are removed from a pad which is then re-used.

Each crib has a cross sectional area of 4 $m^2$, an operating height of 7.5 m, an overall height of 10 m and contained approximately 40 T of ore. The cribs were operated to simulate a commercial operation with 9 sectors. The process was dynamic with periodic removal of leach residue from a leached crib and replacement of the leached residue with fresh ore in a vacant crib.

Three separate phases of operation were undertaken. The range in composition of the principal copper sulfide minerals and gangue minerals contained in the ore samples tested, and a brief description of the operation are summarised in Table 1.

TABLE 1

| Pilot Plant Operational Phases | | | |
| --- | --- | --- | --- |
| Item | Phase I | Phase II | Phase III |
| Ore crush size 80% passing (mm) | 19.05 | 19.05 | 19.05 |
| Copper grade (%) | 0.49-0.75 | 0.38-0.79 | 0.3-0.6 |
| CSR* chalcocite (%) | >10 | 10-20 | 10-20 |
| CSR* covellite (%) | 10-20 | <10 | <10 |
| CSR* chalcopyrite (%) | 40-75 | 65-75 | 40-75 |
| Pyrite (%) | 2-6 | 2-4 | 3-7 |
| Chlorite (% | 0.1-1 | 0-1 | 0-9 |
| Biotite (%) | 0-0.3 | 0-0.03 | 0-2 |
| Kaolinite (%) | 8-16 | 10-45 | 10-30 |
| Description of Phase Operation | Start up and initial data collection | Test variation of leach conditions and ore type. | Operate in closed circuit |

*CSR—Copper Source Ratio (Percentage of the total copper that is contained in this mineral)

The ore samples were crushed in a 3 stage crushing circuit. The crushed ore was agglomerated before being loaded into the cribs. Sodium chloride (salt), acid and raffinate (or other copper, iron and acid containing process liquor) were added to the ore in the agglomeration process. The agglomerated ore was then placed inside an empty crib; cured for a period, following which irrigation commenced. At the end of the irrigation cycle, each crib was drained, irrigated with water to wash, drained again and finally emptied. The empty crib was then prepared to accept a fresh load of agglomerated ore.

Phases I and II related to start-up of the operation and the collection of data.

In the phase III operation low grade ores were included with copper grades as low as 0.3% Cu and with up to 75% of the contained copper associated with chalcopyrite (CSR of chalcopyrite 75%). The operation consisted of a 45 day curing period, 20 day wetting period, 360 days irrigation, 20 days washing and 30 days draining (total 475 days), before unloading and sample processing.

The phase III operating schedule was designed to allow for the loading and unloading of a crib every 45 days, thereby simulating a commercial dynamic pad operation and industrial liquid handling. This closure was imperative in order to obtain steady state impurities concentrations and identification of possible operational problems. The operation was maintained in a closed circuit, and the wash water was reintroduced to generate raffinate to compensate for that lost due to residue moisture and evaporation. The water addition rate was maintained at 0.11 m$^3$/T ore. The fresh make-up water was used for washing loaded organic to remove chloride and for washing residue ore in accordance with the method of invention.

Figure 8:
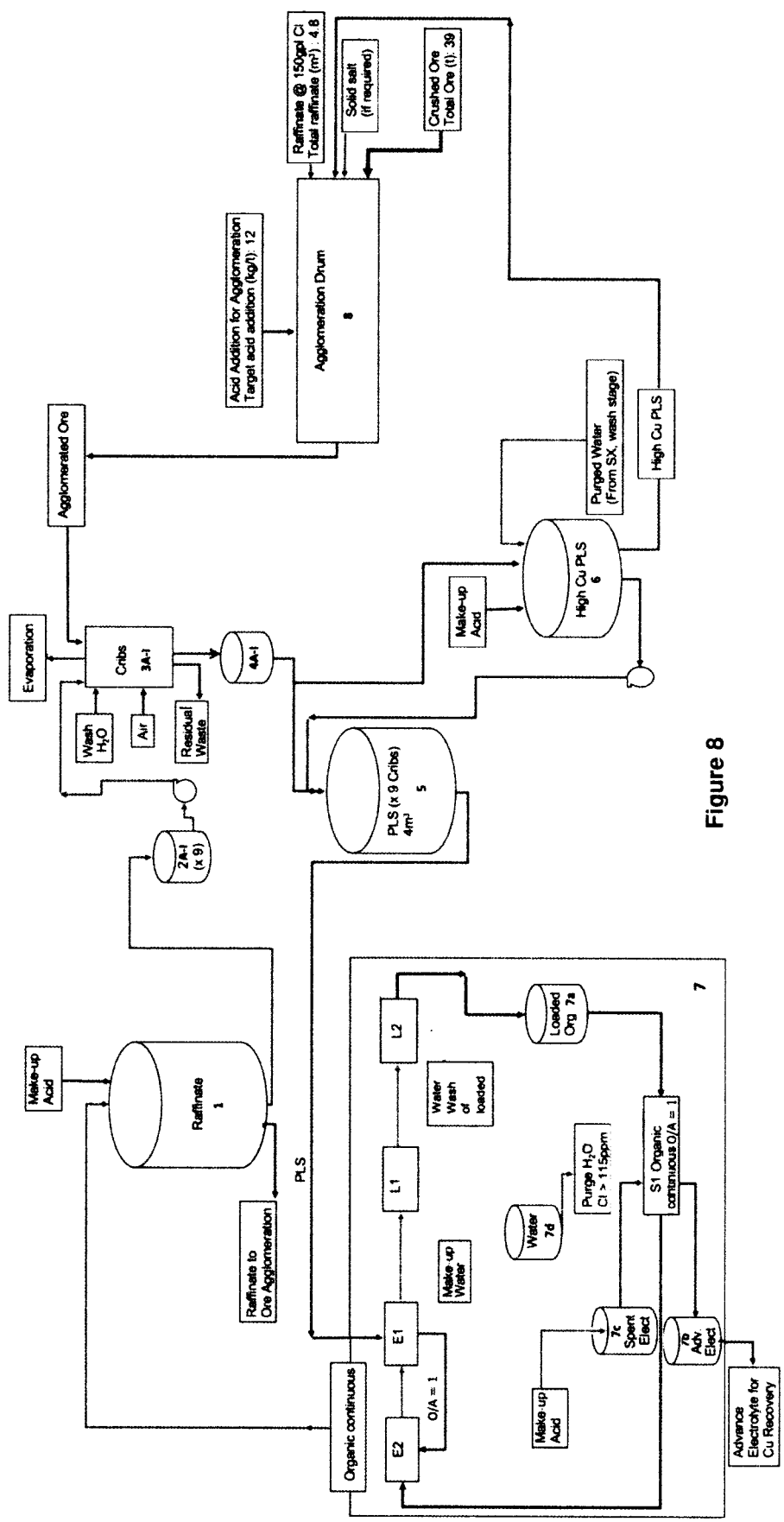
FIG. 8 is a flow sheet of an integrated pilot plant used for treating low grade chalcopyrite ore.

The pilot plant was operated as a closed system with outputs and inputs carefully controlled to mimic a commercial heap leach operation i.e. the addition of fresh water was limited to balance water lost by evaporation, loss as moisture in leached residue (or ripios) and replacement of water lost in process solution purge (if required to lower impurities). The process flowsheet of the pilot plant is shown in FIG. 8. The main components and operation of the pilot plant are summarised as follows:

Raffinate Tank 1: Storage of return raffinate from solvent extraction (SX) 7. Provides feed to separate 1 m$^3$ raffinate feed tanks 2A-I to each crib 3A-I. Make-up acid may be added to the raffinate tank as required to meet the operational acid demand of the process.

Pregnant Leach Solution (PLS) 4 & 5: The PLS solution from each crib (3A-I) is collected in 1 m$^3$ PLS tanks 4A-I. The PLS is transferred from tanks 4A-I to PLS holding tank 5.

High Cu PLS 6: The first PLS collected from initial irrigation of the cribs following ore curing has a high copper content. This initial PLS is collected in holding tank 6. Make-up acid may be added to the high copper PLS in tank 6. Purge water from SX may be added to the high copper PLS in tank 6.

Ore agglomeration 8: Ore is agglomerated in an agglomeration drum. Raffinate from tank 1 is added to ore. Acid and solid salt are added to meet target acid addition and total salt addition as required. The high copper PLS 6 may be used in ore agglomeration to allow direct return of copper and acid (contained in the high Cu PLS) to ore agglomeration. A high copper content in agglomerated ore with acid may improve copper dissolution during ore curing in the initial rest step. Agglomerated ore is transferred to load cribs (3A-I) when required.

Ore is leached in cribs 3A-I: The agglomerated ore is stacked in the cribs. It is allowed to cure (initial rest period). Irrigation is then commenced. Irrigation starts slowly to ensure wetting of the ore. Irrigation is carried out by pumping the low copper raffinate from the solvent extraction process to the top of the cribs. The liquor is distributed over the crib surface by application through a dripper network. The solution permeates down through the ore within each crib. Simultaneously air is introduced into the base of each crib. Copper is solubilised by the combination of the acid in the process liquor and oxygen in the air. The irrigation liquor reports to the base of the crib. It now has an elevated copper content and is called PLS (pregnant leach solution). This is collected and reports to the solvent extraction process.

Following ore leaching the irrigation of the ore with raffinate is stopped. The ore bed is allowed to drain and then the ore is washed with wash water to recover entrained chloride (salt) and dissolved copper. Washed leached ore residue is then removed from the crib to waste.

Solvent Extraction (SX) 7: The copper is recovered from the PLS by solvent extraction. The copper is loaded onto the organic in two extraction stages, E1 and E2. The loaded organic is then washed with water in a two stage wash L1 and L2. The wash is required to remove entrained aqueous solution, so that the chloride content of the advance electrolyte after stripping of loaded organic is <50 ppm. Following the wash stage, loaded organic is then stripped in S1 to recover copper to the advance electrolyte 7b. Spent Electrolyte for loaded organic stripping is provided from holding tank 7c. If required make-up acid may be added to the spent electrolyte in holding tank 7c to increase the acid concentration to the amount required for complete stripping of the loaded organic. Advance electrolyte is removed from the circuit for copper recovery and spent electrolyte is returned to the circuit. The wash efficiency of loaded organic may be improved by increasing the number of wash stages to three, (refer to FIG. 7C). Increased wash efficiency reduces the wash water volume required for washing loaded organic, allowing increased water for washing of leached ore residue resulting in increased recovery of chloride and copper, by displacement of entrained solution in the ore residue.

TABLE 2

Pilot Plant Operating Parameters for Phase I, Phase II and Phase III

| Parameter | Units | Phase I | Phase II & III |
| --- | --- | --- | --- |
| Crib irrigation area (per crib) | m$^2$ | 4 | 4 |
| Ore bed height | m | 5.4 | 7.5 |
| Ore loaded (per crib) | T | 36 | 44 |
| Acid in ore agglomeration | kg/T | 12 | 12 |
| Target moisture in ore agglomeration | mass % | 8.5 | 8.6 |
| Bulk density ore | T/m$^3$ | 1.65 | 1.60 |
| Initial rest or curing period | days | 45 | 45 |
| Ore bed temperature | ° C. | 15-30 | 15-30 |
| Aeration rate | Nm$^3$/h/m$^2$ | 0.13 | 0.13 & 0.325 |
| Raffinate application rate on period | — | 9 h on at 6 L/h/m$^2$ | 12 h on at 6 L/h/m$^2$ |
| Leach cycle operation | days | Irrigation 200-500 | 20 days low irrigation (ore wetting) 360 6ays irrigation, 20 days wash cycle. |

TABLE 2-continued

Pilot Plant Operating Parameters for Phase I, Phase II and Phase III

| Parameter | Units | Phase I | Phase II & III |
|---|---|---|---|
| Flowsheet operation | — | Closed with SX | Closed with SX and wash stage |
| Closed circuit raffinate solution | — | 5 g/L Cu, 15 g/L Fe, 8 g/L H$_2$SO$_4$, 150 g/L Cl | 0.5 g/L Cu, 1-3 g/L Fe, 8 g/L H$_2$SO$_4$, 150 g/L Cl |

Figure 9:
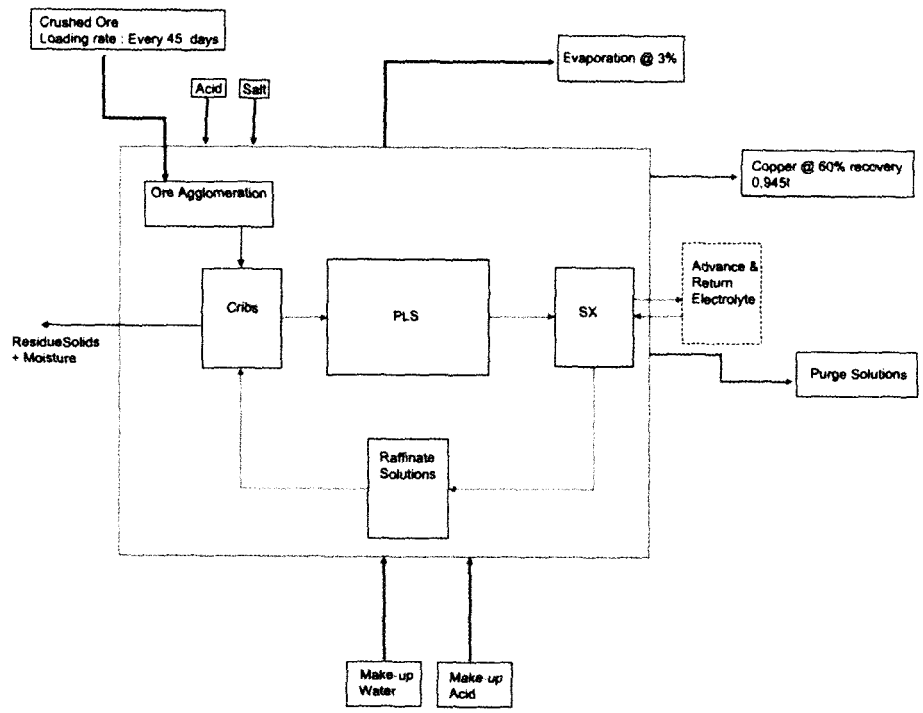
FIG. 9 is a simplified diagram showing inputs and outputs of the pilot plant referred to in connection with FIG. 8.

The simplified mass balance diagram for the pilot heap showing the inputs and outputs is shown in FIG. 9. Typical values for the ore, acid, salt and water balance are shown in Table 3. The results in Table 3 demonstrate that the salt recovered by washing the ore with the operational target of 0.11 m$^3$/T water equalled 9 kg/T, representing a significant saving in terms, of make-up salt required. For the ore treated in Phase II the total copper recovered, including the copper recovered by washing the ore (as shown in Example 2), equalled 60% of the copper in the original ore feed.

to sufficiently reduce the chloride content of the washed organic. The consequence of this would be increased soluble copper loss and increased salt demand. The other option, as described hereinbefore, is to increase the number of stages of the counter current solvent washing stages to 3 or more (FIG. 7C). This would significantly reduce the chloride in the organic after washing without the need to increase the wash water.

This example shows the interaction between the overall process water balance, and the SX wash stage configuration

TABLE 3

Pilot Plant mass Balance Summary Showing Inputs and Outputs
Phase II Pilot Plant Mass Balance

| | Internal Recycle | In | Out | In (kg/T) | Out (kg/T) |
|---|---|---|---|---|---|
| Ore Balance | | | | | |
| Total Ore loaded dry (T) - 9 cribs | | 348.6 | | — | |
| Total copper loaded (0.5% CuT) (T) | | 1.743 | | 5.00 | |
| Total copper recovered @ 60% recovery average (T) | | | 1.046 | | 3.00 |
| Total copper lost in residues (T) | | | 0.697 | | 2.00 |
| Total residues un-loaded (T) | | | 348.6 | | — |
| Acid Balance | | | | | |
| Agglomeration acid added @ 12 kg/t (kg) | | 4183 | | 12.0 | |
| Acid loss in residue moisture @ 10.5% moisture (kg) | | | 18 | | 0.05 |
| Net Acid consumtion (by gangue and metals dissolution) @13.2 kg/t NAC kg) | | | 4616 | | 13.24 |
| Make-up acid added (kg) | | 451 | | 1.29 | |
| Salt Balance | | | | | |
| Total salt addition: Raffinate + solid salt make-up @ 15 kg/T (kg) | 5229 | | | | |
| Solid salt make-up (kg) | | 2092 | | 6.000 | |
| Salt Recovered from washing ore residue @ 60% wash efficiency (kg) | 3137 | | | | |
| Salt lost in residues (kg) = Solid Salt make-up | | | 2092 | | 6.000 |
| Water Balance | | | | | |
| SX organic wash water (m3) | | 4.308 | | | |
| Wash water @ 0.1 m3/t (m3) | | 34.86 | | | |
| Moisture in residues @ 10.5% average - (m3) | | | 36.6 | | |
| Water loss due to evaporation @ 5.4 L/day (m3) | | | 2.57 | | |
| Purged water (m3) | | | Zero | | |
| (Agglomeration raffinate added @ 0.1 m3/t (m3)) | 33.5 | | | | |

Table 3 shows that the solvent extraction wash water was 4.3 m$^3$ for the 348 tons of ore treated through the process over a period. The wash water used to wash ore, post leach, was ~8× more than that at 34.9 m$^3$, so there is very little scope to improve ore washing by further reducing the solvent extraction wash in this instance. However, the performance of the solvent extraction wash was unsatisfactory at this wash volume with a two stage configuration. The chloride concentration of the entrained solution in the loaded organic after washing is of the order of 600 ppm. The wash water allocated to solvent extraction could be increased but this would be detrimental to the amount of water that could be used for washing the leached ore and would be unlikely on the overall plant performance. The example demonstrates that efficient washing of loaded organic requires multiple stages of washing to minimise the volume of wash water addition and to achieve target chloride levels in the advance electrolyte. This result is in accordance with the principles described hereinbefore for the water available for washing the residue is maximised.

Example 2: Wash Efficiency Curves and Recovery of Copper and Chloride

Figure 10:
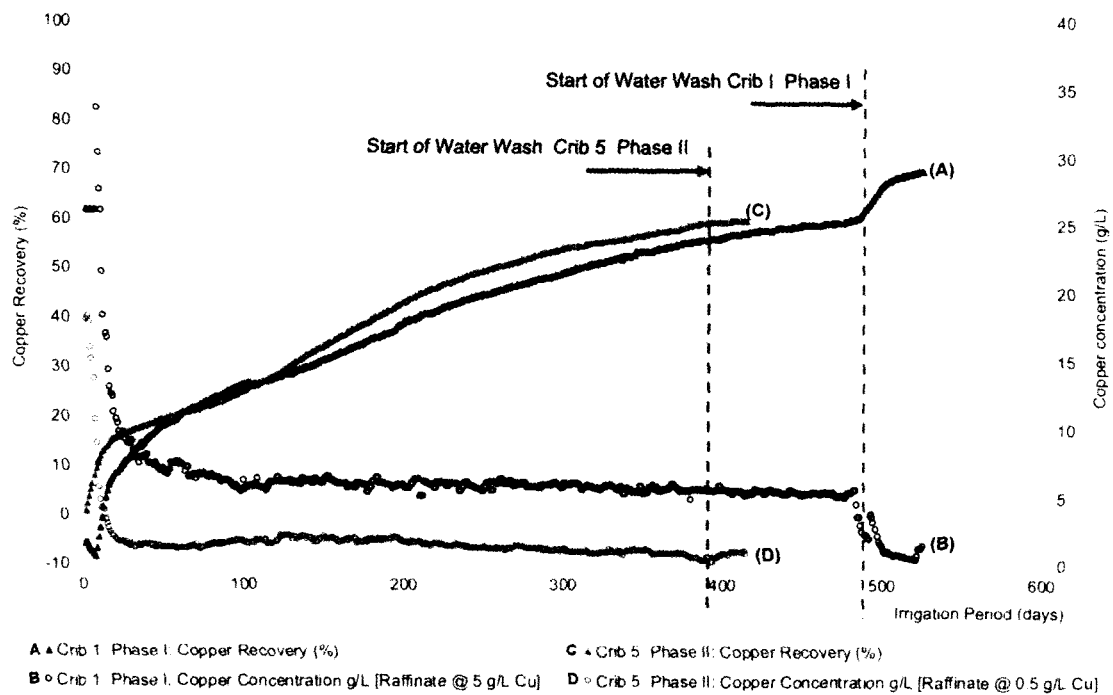
FIG. 10 shows copper recovery curves as a function of irrigation period for a number of cribs during different phases of operation of the pilot plant.

Copper Recovery: The results presented in FIG. 10 show the copper recovery and the PLS (or irrigation drainage solution) copper concentration profile as a function of time for operation of two cribs, crib 1 in phase I (ore A; 0.5% Cu and 60% CSR chalcopyrite) and crib 5 in phase II (ore B; 0.65% Cu and 75% CSR chalcopyrite) of the pilot plant operation.

In crib 1 of phase I, the irrigation solution, or raffinate, contained 5 g/L copper. The results show that for the ore sample treated the copper recovery at the end of the leach cycle was 59%. The leached residue was allowed to drain and then washed with water to recover entrained dissolved copper. The displacement of the copper from the residue ore by water washing increased the copper recovery to 70%, as shown in FIG. 10.

In crib 5, phase II the irrigation solution, or raffinate, contained 0.5 g/L copper. The results show that for the ore sample treated the copper recovery at the end of the leach cycle was 59.5%. The leached residue was allowed to drain and then washed with process water to recover entrained dissolved copper. The displacement of the copper by water washing increased the copper recovery to 60%, as shown in FIG. 10.

The reason why in crib 1 the copper recovery increased by 11% and in crib 5 it only increased by 0.6% is because crib 1 was irrigated with a high copper containing solution (5 g/l) and hence there was considerable soluble copper retained in the crib at the end of leaching. In the case of crib 5, it was irrigated with a solution continuing $\frac{1}{10}^{th}$ the concentration of copper of the solution used for crib 1. Hence the amount of soluble copper retained in the crib prior to washing was that much lower.

Careful operation of the solvent extraction process can reduce soluble copper loss by providing a low copper raffinate with which to irrigate the process.

Chloride Recovery: As stated, careful operation of the solvent extraction process can reduce soluble copper loss by providing a low copper raffinate with which to irrigate the process. This is not the case for chloride. The process requires an elevated chloride content in the irrigation liquor (~150 g/l) to maximise chalcopyrite leaching. Any residual chloride that is left entrained in the leached ore (ripios) that is removed from the heap has to be made up by the addition of sodium chloride or an alternative chloride source (HCl, MgCl etc).

Figure 11:
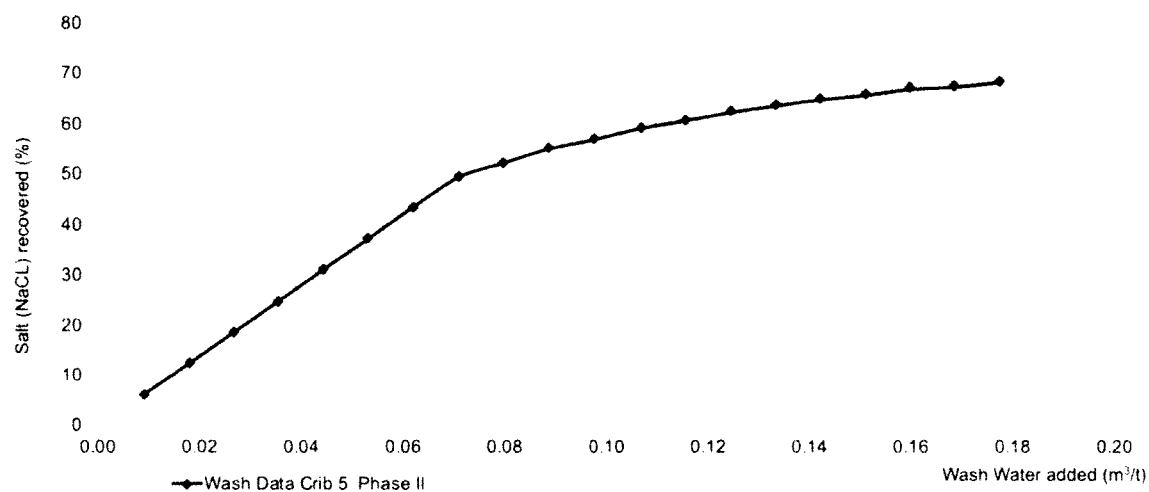
FIG. 11 is a curve of wash efficiency (salt recovery) as a function of wash water addition for one crib in the pilot plant during a second phase of operation.

The wash efficiency in respect of chloride recovery is shown in FIG. 11. This data comes from the results for the process water wash of crib 5 phase II. The results show an increased recovery of chloride as the amount of wash water volume applied is increased. The water balance of the pilot plant process flowsheet requires that water used for washing residue ore is limited to match water lost from the process less other fresh water inputs. Water is lost as moisture in residue ore removed from the pilot plant, by evaporation and can be removed if liquor is purged from the circuit. The other fresh water input to the circuit, is fresh water used in the solvent extraction loaded organic wash step, to remove entrained chloride.

The maximum volume of water available for washing the residue ore is of the order of 0.1 m³ per tonne ore. The results presented in the example shown in FIG. 11, indicate that at this volume of wash water per tonne ore the wash efficiency (or chloride recovery) was equal to about 60%.

Figure 12:
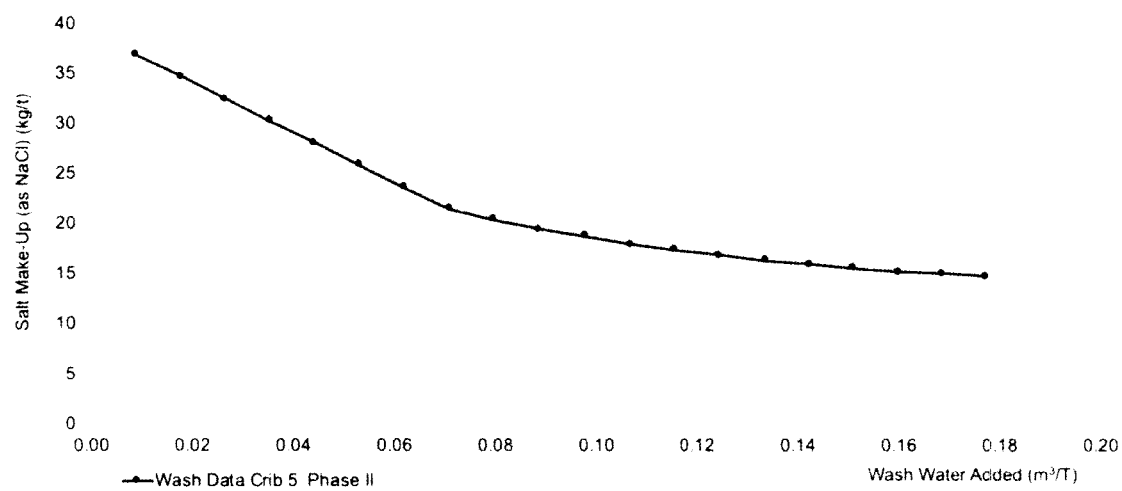
FIG. 12 graphically depicts the quantity of salt required for make-up as a function of wash water added, for the crib referred to in connection with FIG. 11.

The recovery of chloride achieved by the water wash may also be expressed as the equivalent chloride that must be added to make-up for chloride lost in the moisture in the residue ore. The salt (NaCl) make-up for the wash curve of crib 5 phase II, indicates that at a wash ratio of 0.1 m³/T the salt (NaCl) make-up is about 18 kg/T, as shown in FIG. 12.

Example 3: The Build-Up of Impurities

Washing is considered to retain chloride and marginally increase recovered copper. The negative aspect is that the potentially unwanted species that arise from the reaction of acid with gangue minerals will also be retained in the process.

The reaction of gangue minerals with acid will result in dissolution of metals such as Ca, Si, Al, Mg, Fe, and K. These dissolved species will build up in solution until they reach a concentration such that the mass of the dissolved species in the washed ore after leaching is equivalent to the mass that dissolved less any of the species that re-precipitated after leaching.

Figure 13:
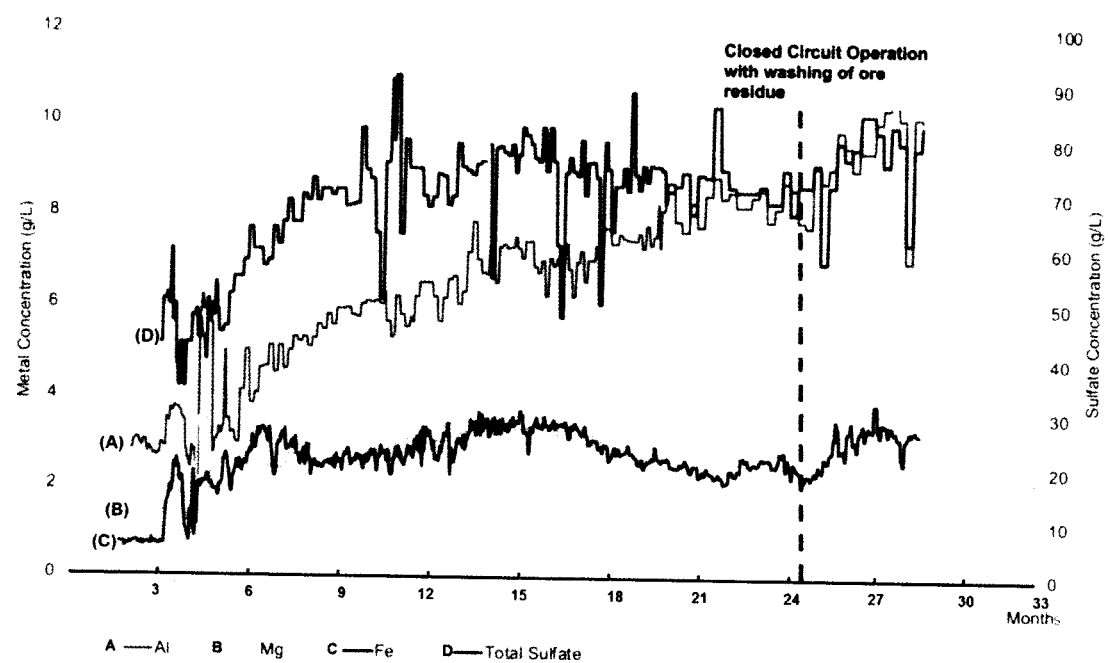
FIG. 13 shows how impurity metals (aluminium, magnesium and iron) and sulfates build up in raffinate in the pilot plant as a function of time.

The build-up of impurities in the pilot plant raffinate under closed circuit operation with washing is shown in FIG. 13. The concentration of aluminium and magnesium (dissolved by acid dissolution of gangue mineral silicates such as biotite and chlorite) clearly increases with the period of operation in a closed circuit and reached concentrations of about 10 g/L and 5 g/L respectively. The total iron concentration is in the range of 2-4 g/L. The total sulfate concentration is about 80 g/L.

In general, the accumulation of such species plus the addition of sodium chloride result in solutions that are saturated. It is known already that sulfate will precipitate out of solution as insoluble iron jarosites (Na or K jarosite for example), as metasideronatrite [$Na_2Fe^{3+}(SO_4)_2(OH)\cdot(H_2O)$], and also at low temperatures and high saturation levels, possibly as sodium sulfate, aluminium sulfate and/or magnesium sulfate. The precipitation of Na, Al or Mg, or Fe sulfates will be dependent on temperature (increased precipitation at lower temperature) and acidity, where jarosite and metasideronatrite precipitation will increase at low acidity levels, that is, at higher solution pH values.

The precipitation of iron sulfates and other metal sulfates may cause problems in the operating circuit particularly when environmental temperatures are low (<20° C.) and salt precipitation is increased. Possible problems include:
 precipitation of sulfate salts in dripper lines used for heap irrigation, causing blockage of lines and failure of effective heap irrigation;
 precipitation of salts in solution holding ponds reducing effective volume; and
 precipitation in layers within the heap causing pore space blockage and poor solution flow and distribution through the ore bed possibly reducing copper recovery.

The amount of precipitation will be a function of the degree of washing. There may be a point in the process where the optimisation of recovery of chloride is offset by costs generated by process problems resulting from the accumulation and precipitation of unwanted species. If this occurs a reduction in the degree of washing may be required.

The invention claimed is:

1. A method of maximizing an amount of water which is available for rinsing leached residue ore in a high-chloride heap leach operation comprising the steps of heap leaching, solvent extraction including an organic phase, and copper electrowinning, the heap leaching step including a leach liquor having high chloride concentrations of 100 to 230 g/L chloride:
 wherein the heap leaching step comprises adding process make-up water in the range of 0.05 to 0.35 m³/ton of leached residue ore to rinse the leached residue ore, thereby displacing a chloride-containing aqueous liquor including copper from the leached residue ore, wherein the solvent extraction step comprises utilizing a multi-stage counter-current loaded organic solvent scrub circuit to increase an amount of process water available for rinsing and reduce the chloride concentration in the organic phase to below 50 ppm.

2. The method according to claim 1, wherein the quantity of process make-up water is in the range of 0.1 and 0.15 m$^3$/ton of leached residue ore.

3. The method according to claim 1, wherein the displaced chloride-containing aqueous liquor is recovered and recycled to the high-chloride heap leach operation thereby to decrease a quantity of make-up salt which would be necessary to add to the high-chloride heap leach operation.

4. The method according to claim 1, wherein rinsing by the process make-up water is carried out for a period of from 5 to 100 days.

5. The method according to claim 4, wherein the period is 20 days.

6. The method according to claim 1, wherein any copper recovered in the chloride-containing aqueous liquor displaced during rinsing the leached residue ore is returned to the high-chloride leach operation and is subsequently recovered through the solvent extraction step and the copper electrowinning step.

7. The method according to claim 1, wherein a ratio of chloride recovered in the chloride-containing aqueous liquor, displaced during rinsing the leached residue ore by the process make-up water, to a total chloride content in the leached residue ore, is between 40 and 85%.

8. The method according to claim 7, wherein the ratio is 60%.

* * * * *